(12) United States Patent
Terry

(10) Patent No.: US 8,171,839 B2
(45) Date of Patent: May 8, 2012

(54) REUSABLE EXPLOSIVE BOLT

(76) Inventor: Brandon Terry, Salt Lake City, UT (US)

( * ) Notice: Subject to any disclaimer, the term of this patent is extended or adjusted under 35 U.S.C. 154(b) by 149 days.

(21) Appl. No.: 12/705,615

(22) Filed: Feb. 14, 2010

(65) Prior Publication Data

US 2011/0200384 A1    Aug. 18, 2011

(51) Int. Cl.
*F41F 5/00* (2006.01)
(52) U.S. Cl. .......................................... 89/1.14; 403/15
(58) Field of Classification Search ................... 89/1.14, 89/1.1; 102/293; 403/15; 411/391, 434; 137/68.13
See application file for complete search history.

(56) References Cited

U.S. PATENT DOCUMENTS

| | | | | | |
|---|---|---|---|---|---|
| 2,948,923 | A | * | 8/1960 | La Rocca et al. | 425/1 |
| 3,087,369 | A | * | 4/1963 | Butterfield | 411/391 |
| 3,237,521 | A | * | 3/1966 | Francis | 89/1.1 |
| 3,265,408 | A | * | 8/1966 | Dickie | 285/3 |
| 5,136,925 | A | * | 8/1992 | Spariat et al. | 89/1.14 |
| 6,227,493 | B1 | * | 5/2001 | Holemans | 244/173.1 |
| 6,662,702 | B1 | * | 12/2003 | Vidot et al. | 89/1.14 |

* cited by examiner

*Primary Examiner* — Michael Carone
*Assistant Examiner* — Daniel Troy

(57) ABSTRACT

An axial loaded explosive bolt that can repeatedly be used for the purpose of remotely or automatically activating a timely separation of adjoining walls separated by a finite distance by the means of either an explosive charge or activation of a pressurized gas line. The fastener includes two bolts with internal bores that are attached by the means of a two-piece encapsulation connected by an inter-connecting clasp. The fastener assembly employs the use of either a combination of a thermal igniter and a pyrotechnic charge or a pressurized gas line attached to a solenoid valve and pressurized gas storage unit to supply a force sufficient to properly separate the said mechanical fastener assembly.

2 Claims, 2 Drawing Sheets

REUSABLE EXPLOSIVE BOLT

BACKGROUND OF THE INVENTION

The invention relates to an axial loaded explosive bolt that can repeatedly be used for the purpose of remotely or automatically activating a timely separation of two walls separated by a finite distance by the means of either an explosive charge or the activation of a pressurized gas line.

Explosive bolts are commonly used for the connection and separation mechanisms in circumstances such as multi-staged rocket vehicles, deployment of satellites, and emergency disconnects in various applications. In the said situations, non-reusable fasteners with an explosive charge are employed to ensure timely separation of all needed components. However, in some applications there is a need to separate components of an assembly, ensure all components to be intact, and then reassemble the said assembly in a relatively quick manner.

Additionally, in many applications, a large compressive axial load and a relatively small tensile load are applied the system; therefore, material choice and the minimum cross sectional area are critical to the maximum load allowed by the system. Further, with such a load, there is commonly a need to separate in the axial direction as opposed to in the radial direction as in standard bolts.

In addition, the point of separation may be a location containing sensitive materials to the overall system reliability and sustainability. Therefore, shrapnel and debris at high velocities can potentially disrupt both proper/safe separation of intended components as well as disrupt surrounding, sensitive materials. Further, in some select circumstances the point of separation may be heat/flame sensitive and/or occurring at a very high altitude. In such circumstances, the use of an explosive bolt employing a pyrotechnic charge is not desirable.

SUMMARY OF THE INVENTION

It is the object of the invention to provide a means to ensure repeatable, timely separation of two bodies separated by a finite distance by the means of two rods containing internal, removable thermal igniters connected by the means of a two-piece encapsulation containing an explosive charge connected by an interconnecting clasp.

It is a further object of the invention to force the encapsulation to separate in the axial direction when the said explosive charge applies a force sufficient to overcome the spring load of the interconnecting clasp, while not applying a force sufficient to cause failure, fracture, or plastic deformation to the two-piece encapsulation, thus not introducing shrapnel into the point of separation. In situations where pyrotechnics are not favorable, an attachment to use a separate storage container of pressurized gas attached to a solenoid valve may be employed in order to allow safe separation of desired components.

It is a further object of the invention to assure axial loading in compression up to the point of material failure as determined by the minimum cross-sectional area of the bolts used, while still allowing axial loading in tension up to the set spring load of the said clasps, at which point a safe release of encapsulation pieces occurs.

It is a further object of the invention to allow all components of the invention, with the exception of igniter(s), explosive charge, o-ring(s), and pressurized gas storage device(s), to be in such condition after use so that it can be reassembled and reused in a short period of time.

Further objects and supplemental functionality of the invention is to be inferred from the following descriptions of technical drawings, applications, and claims:

DESCRIPTION OF THE PREFERRED EMBODIMENT

Figure 1:
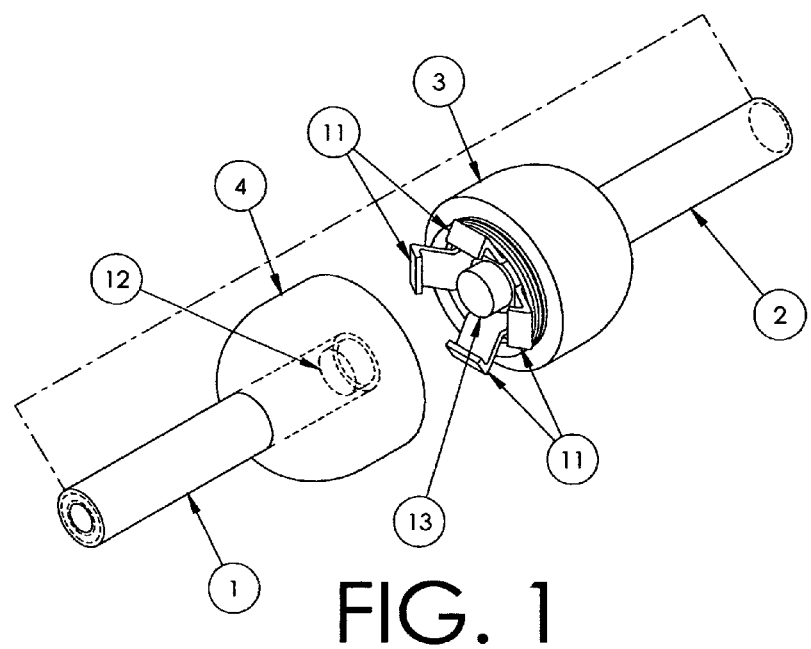
FIG. 1 is an isometric, explosion view containing the two halves of the invention that come together form a complete mechanical fastener.
Figure 2:
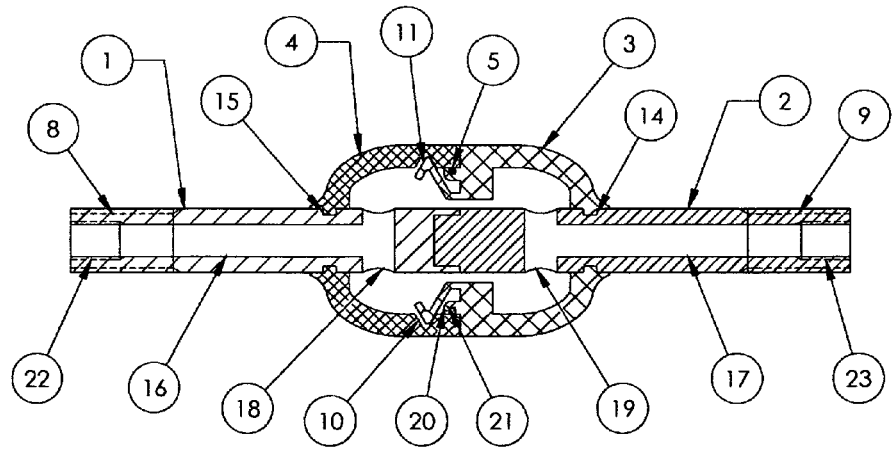
FIG. 2 is a sectional view of the fully assembled mechanical fastener of FIG. 1.

The invention, as shown in FIGS. 1 through 4, comply to the said objects of the invention by incorporating an explosive bolt that is held together by the means of a reusable, interconnecting clasp. In specific, FIGS. 1 and 2 show bolt 1 with threads 8 and 22 on one end and a female fitting 12 on the opposite end. Bolt 1 incorporates an axial drilled hole 16 that is drilled from threads 22 until it intersects through-hole 18. Bolt 1 then mates with bolt 2, which contains threads 9 and 23 on the opposite side of threads 8 and 22, and a male fitting 13 on the mating end of bolt 2. Bolt 2 also incorporates an axial drilled hole 17 that is drilled from threads 23 until it intersects through-hole 19. Both bolts 1 and 2 can be made from any material that has a high modulus of elasticity, yet still has high machinability, such as steel.

Bolts 1 and 2 are held in place by the means of encapsulations 3 and 4. Encapsulation 4 is attached to bolt 1 by the means of a slot 15 on bolt 1. Encapsulation 4 then incorporates a groove 10, which has the purpose of mating with corresponding clasps 11. Encapsulation 3 connects to bolt 2 in a like manner as encapsulation 4, attaching by the means of slot 14 to bolt 2. Encapsulation 3 incorporates a small shelf 20 that sits flush on the inner wall of encapsulation 4 and has a small channel 21 which holds an o-ring 5. Encapsulation 3 also has clasps 11 that are shaped accordingly to mate with groove 10 sufficiently such that there is a pre-loaded spring force between groove 10 and clasps 11, thus mating and securing bolts 1 and 2. Encapsulations 3 and 4 and all attached appendages therein can be made of an easily injection-molded material such as thermoplastics. However, the material used must have sufficient strength such that the material can withstand the pressures associated with separation of the bolt assembly without causing failure, fracture, or plastic deformation to the two-piece encapsulation.

Figure 3:
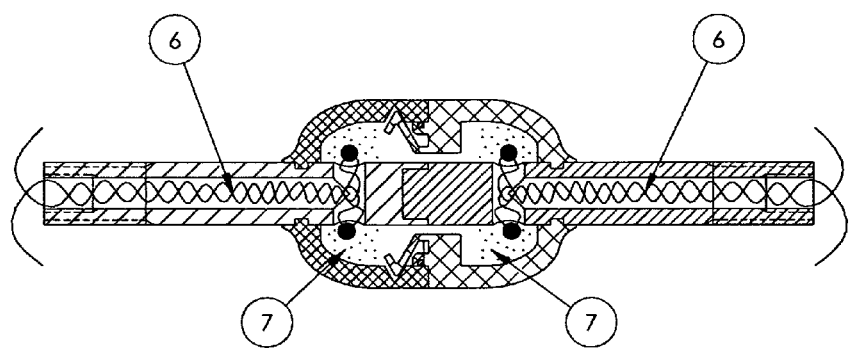
FIG. 3 is a sectional view corresponding to FIG. 2 in which thermal igniters and pyrotechnic charges are employed.

In FIG. 3, thermal igniters 6 are then inserted into bores 16 and/or bore 17. The corresponding encapsulations are then filled with pyrotechnic, explosive charges 7 sufficient to cause separation of bolts 1 and 2, but refrain from failure, fracture, or plastic deformation of encapsulations 3 and 4. In order to ensure that the pressurized gasses produced by the ignited pyrotechnic charge 7 does not travel out of the bolt bores, a grommet or threaded plug 28 may be used at threads 22 and/or 23.

Figure 4:
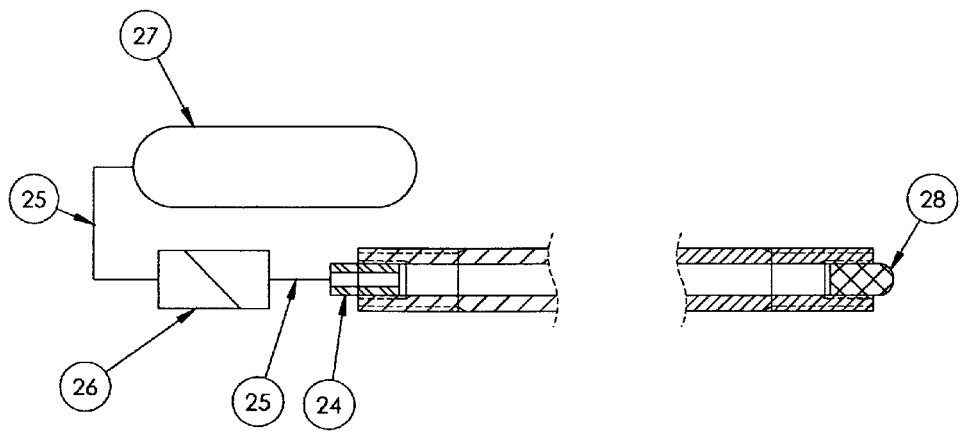
FIG. 4 is a break of the sectional view corresponding to FIG. 2 in which a gas line, solenoid valve, pressurized storage tank, and plug are employed.

In the event that pyrotechnics charges 7 are not favorable, FIG. 4 shows that gas lines 25 connected to a solenoid valve 26 and a source of pressurized gas 27 can be connected to bolts 1 and/or 2 at the respective threads 22 and/or 23 by the means of a threaded NPT connector 24. In the event that a gas line assembly 24-27 is not connected to both threads 22 and 23, the thread not connected to the gas line assembly 24-27 can then be connected to a threaded plug 28, thus not allowing pressurized gasses to exit the bore of the corresponding bolt.

A reusable explosive bolt of such description is useful in applications such as large, amateur rockets. Currently, explosive bolts are not commonly employed due to non-reusability. However, in the said application, the invention could be easily applied for use in body tube section separation and/or stage separation. In large, amateur rockets, the point(s) of separation are generally subjected to a large axial compression load during powered flight, need to be separated in the axial direction, are commonly a location of sensitive recovery components and/or motors of a subsequent stage, and often have the need to be reassembled and reused in a relatively short period of time.

It should be understood that variations, modifications, and improvements can be made to the invention. Therefore, attention should be paid to the claims to understand the formal scope of the invention.

The embodiments of the invention in which an exclusive property or privilege is claimed are defined as follows:

1. A separable mechanical fastener consisting of: a first bolt including an axial bore extending from a first end of the first bolt to a radial through hole which is perpendicular to the axial bore and a female portion located at a second end of the first bolt; a second bolt including an axial bore extending from a first end of the second bolt to a radial through hole which is perpendicular to the axial bore and a male portion located at a second end of the second bolt, wherein the male portion and female portion engage each other; an encapsulation element comprising: a first encapsulation half, attached to the second end of the first bolt, including an interior groove and a second encapsulation half, attached to the second end of the second bolt, including spring loaded clasps and an o-ring, wherein the spring loaded clasps engage the interior groove to hold the first half and second half together to encapsulate the male portion and female portion; and a pressurizing means configured to provide fluid pressure to the interior of the encapsulation element to separate the male portion and female portion.

2. The separable mechanical fastener of claim 1 wherein the pressurizing means is configured to separate the engagement of the spring clasps and the interior groove and not cause failure, fracture, or plastic deformation of the encapsulation element.

* * * * *